UNITED STATES PATENT OFFICE.

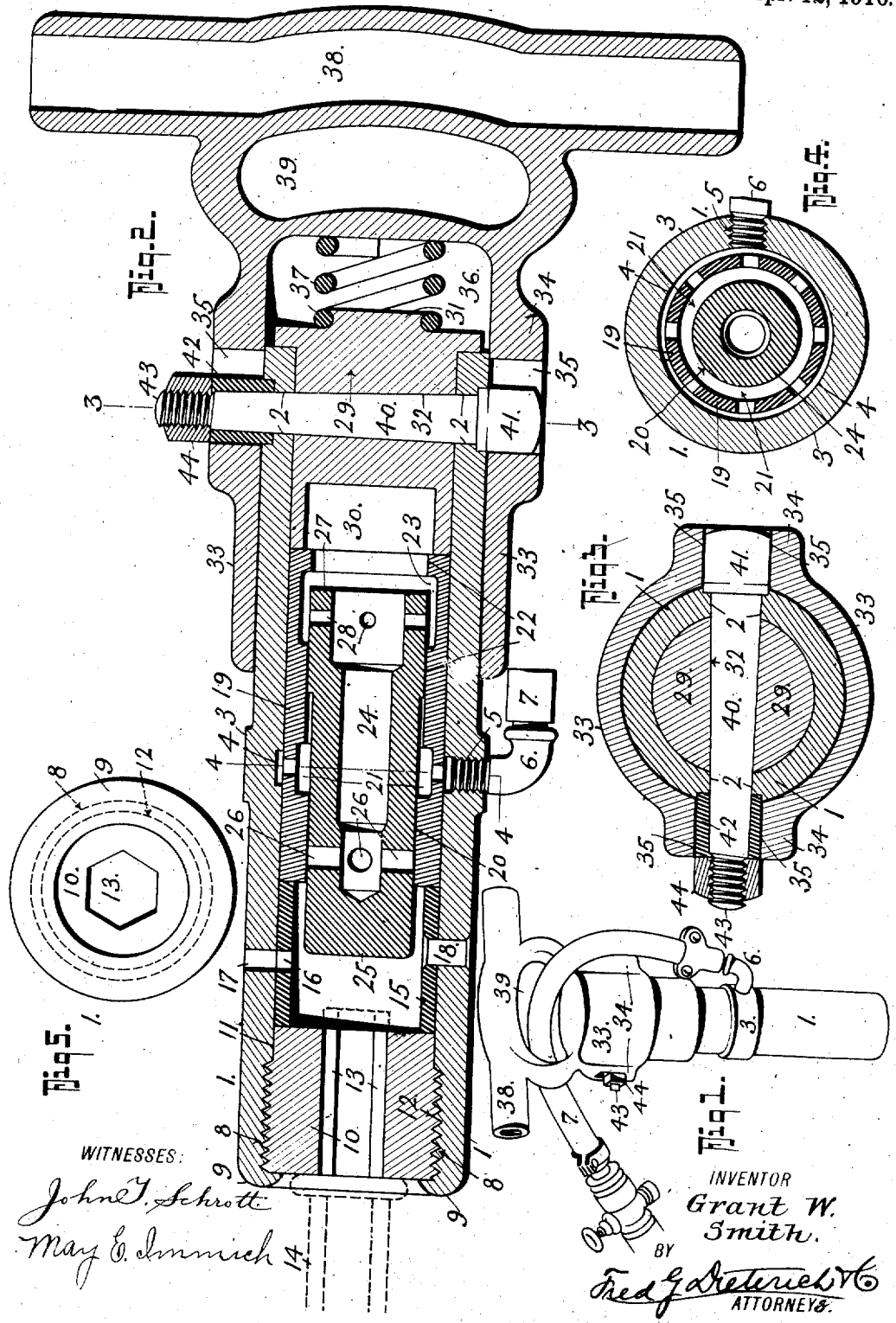

GRANT W. SMITH, OF CHATTANOOGA, TENNESSEE.

ROCK-DRILL.

954,706. Specification of Letters Patent. Patented Apr. 12, 1910.

Application filed July 8, 1909. Serial No. 506,590.

*To all whom it may concern:*

Be it known that I, GRANT W. SMITH, residing at Chattanooga, in the county of Hamilton and State of Tennessee, have invented certain new and useful Improvements in Rock-Drills, of which the following is a specification.

My invention relates to certain new and useful improvements in air or steam operated rock drills, and in its generic nature, the invention resides in providing an outer barrel inclosing an inner barrel of hardened tool steel in which the hammer piston operates.

The invention also includes an improved means for maintaining the drill holding chuck in position and means for maintaining the inner barrel in its proper position, together with means for relieving the jar on the handle which is adapted to be grasped by the operator.

In its more subordinate nature, the invention embodies certain novel details of construction, combination and arrangement of parts whereby a simple and effective construction of drill is produced that can be easily and cheaply manufactured and in which the parts may be readily assembled and disassembled and new parts substituted for those which become damaged or worn.

In the drawings, Figure 1, is a perspective view of my improved drill. Fig. 2, is a central, vertical longitudinal section thereof. Fig. 3, is a cross section on the line 3—3 of Fig. 2. Fig. 4, is a cross section on the line 4—4 of Fig. 2. Fig. 5, is a front elevation of the drill.

Referring now to the accompanying drawings, in which like numerals of reference indicate like parts in all of the figures, 1 represents the outer barrel which is formed of a straight piece of tubing having a straight bore throughout its entire length. The barrel 1 has apertures 2—2 near one end to permit passage of a tapered bolt 40, hereinafter again referred to. About midway its ends the barrel 1 is formed with an annular enlargement 3 and provided with an internal annular groove 4 at such enlargement. The barrel is apertured and tapped at 5 to receive the nipple 6 of the air pipe 7 to convey compressed air or other suitable fluid into the annular bore 4.

The outer end of the barrel 1 is internally threaded at 8 to receive the drill holding chuck 10, which is provided with a threaded portion 12 and a non-threaded portion 11, the end of the barrel 1 being upset or beaded over as at 9 to retain the chuck 10 in place. The chuck 10 is provided with a bore to receive the drill 14 of any approved type.

Fitted within the barrel 1 is a bushing 15 that has an aperture 16 to register with a corresponding aperture 17 in the barrel 1 to form an exhaust port for the drill, the bushing 15 being held from turning in the barrel 1 by a rivet 18 that secures the bushing and barrel together.

19 is a tool steel inside barrel which fits within the bore of the barrel and abuts the bushing 15, this barrel 19 being one of the principal features of my present invention. The barrel 19 is provided with a bore 20 of one diameter and a bore 22 of a slightly greater diameter to receive the piston 24. At the juncture of the bore 20 with the bore 22 the barrel 19 is provided with an internal annular groove 21 from which radiate a series of apertures to receive the working agent from the annular groove 4 in the barrel 1. A second internal annular groove 23 is formed in the barrel 19 near one end thereof.

24 designates the hammer piston of the usual type which has the hammer head 25 and the radial apertures 26 that communicate with the bore of the piston at one end and the apertures 28 that communicate with the bore of the piston at the other end, the piston having an enlarged end 27 to operate in the bore 22 of the barrel 19, while the portion of reduced diameter of such piston projects through the bore 20 of the barrel 19. It is to be noted that the rear end of the piston 24 is open at all times.

29 is a flanged plug which snugly fits within the barrel 1 and abuts the barrel 19 to hold it against the bushing 15, the plug being transversely apertured at 32 to_permit passage of the tapered bolt 40, and on the inner end the plug 29 is chambered at 30 to form a continuation of the hammer piston chamber. The plug 29 has a projection 31 to receive a spring 37 which is held in the bore 36 of a sleeve 33, which sleeve has an enlarged portion 34 provided with longitudinal grooves 35 in which the head 41 of the bolt 40 and a squared washer 42 are held, a nut 44 on the threaded end of the bolt 40 serving to draw the bolt 40 tightly into position. The sleeve 33 has a hollow handle 38 that is adapted to be grasped by the operator and where the handle and sleeve join, an opening 39 is provided to permit passage of the air hose 7.

It is to be noted that in practice, the barrel 1 is made of a relatively soft steel while the barrel 19 is of hardened steel, and the chuck 10 is also formed of hardened steel.

From the foregoing description taken in connection with the accompanying drawings it is thought the complete construction, operation and numerous advantages of my invention will be readily understood by those skilled in the art to which the invention appertains.

What I claim is:

1. A drill comprising an outer barrel having a straight bore of uniform diameter throughout its length and having one end internally threaded, an inner hardened barrel within the outer barrel and a hammer piston operating within said barrels, together with means for leading working agent to said piston to operate the same, said outer barrel having an exhaust port, a drill chuck threaded into the threaded end of said outer barrel, a closure plug within the other end of said outer barrel, a sleeve having a handle and provided with a bore to receive such outer barrel, and a single means for securing said closure plug into said outer barrel and securing said outer barrel in said handle carrying sleeve.

2. A rock drill comprising an outer barrel having a bore of uniform diameter throughout, a chuck firmly held within one end of said barrel, an inner hardened steel barrel removably held within the outer barrel, a bushing for spacing said inner barrel from said chuck, said outer barrel and bushing having exhaust ports, and means for securing said bushing to said outer barrel, said inner barrel having a bore, and an internal groove and a hammer piston coöperatively operating within said inner barrel, said outer barrel having an annular enlargement and an internal annular groove at such enlargement, and said inner barrel having ports registering with said outer barrel groove, said outer barrel having an inlet port registering with said outer barrel groove, a closure plug having a chamber and inserted within the other end of said outer barrel, said outer barrel having bolt apertures and countersunk recesses merging therewith, and said closure plug having a bolt aperture, a tapered bolt having a head and projected through said plug and outer barrel apertures, said head having a portion to enter one of the countersunk portions of said outer barrel, a washer secured to said bolt and partly projecting into the other countersunk portion of said outer barrel, a nut threaded onto said bolt for securing said bolt in position, and a handle member resiliently mounted on said outer barrel and secured in position by said bolt.

3. A rock drill comprising an outer barrel having a bore of uniform diameter throughout, a chuck firmly held within one end of said barrel, an inner hardened steel barrel removably held within the outer barrel, a bushing for spacing said inner barrel from said chuck, said outer barrel and bushing having exhaust ports, means for securing said bushing to said outer barrel, said inner barrel having a bore, and an internal groove and a hammer piston coöperatively operating within said inner barrel, said outer barrel having an annular enlargement and an internal annular groove at said enlargement, and said inner barrel having ports registering with said outer barrel groove, said outer barrel having an inlet port registering with said outer barrel groove, a closure plug having a chamber and inserted within the other end of said outer barrel, said outer barrel having bolt apertures and countersunk recesses merging therewith, said closure plug having a bolt aperture, a tapered bolt having a head and projected through said plug and outer barrel apertures, said head having a portion to enter one of the countersunk portions of said outer barrel, a washer secured to said bolt and partly projecting into the other countersunk portion of said outer barrel, a nut threaded onto said bolt for securing said bolt in position, a sleeve having a bore to receive said outer barrel, said sleeve having an annular enlargement provided with longitudinal slots to receive the head of said bolt and said washer, and a coil spring within said sleeve bore to abut said closure plug, substantially as shown and described.

4. A rock drill comprising an outer barrel having a bore of uniform diameter throughout, a chuck firmly held within one end of said barrel, an inner hardened steel barrel removably held within the outer barrel, a bushing for spacing said inner barrel from said chuck, said outer barrel and bushing having exhaust ports, means for securing said bushing to said outer barrel, said inner barrel having a bore, and an internal groove and a hammer piston coöperatively operating within said inner barrel, said outer barrel having an annular enlargement and an internal annular groove at said enlargement, and said inner barrel having ports registering with said outer barrel groove, said outer barrel having an inlet port registering with said outer barrel groove, a closure plug having a chamber and inserted within the other end of said outer barrel, said outer barrel having bolt apertures and countersunk recesses merging therewith, said closure plug having a bolt aperture, a tapered bolt having a head and projected through said plug and outer barrel apertures, said head having a portion to enter one of the countersunk portions of said outer barrel, a washer secured to said bolt and partly projecting into the other countersunk portion of said outer barrel, a nut threaded onto said bolt for securing said bolt in position, a sleeve having a bore to receive said outer barrel, said sleeve having an annular enlargement provided with longitudinal slots to receive the head of said bolt and said washer, a coil spring within said sleeve bore to abut said closure plug, and a handle portion formed with said sleeve, said handle member at the juncture with the sleeve having an aperture to permit passage of an air hose.

GRANT W. SMITH.

Witnesses:
ANNIE L. JOHNSON,
JAMES F. FINLAY.